United States Patent
Tran et al.

(10) Patent No.: US 6,417,986 B1
(45) Date of Patent: Jul. 9, 2002

(54) IMPACT GUARD FOR LIMITING HARD DISK MOVEMENT

(75) Inventors: Gregory Tran; Ki Tag Jeong; Youn Tai Kim; Jeong Jong Hoon, all of Santa Clara, CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/428,606

(22) Filed: Oct. 27, 1999

Related U.S. Application Data

(60) Provisional application No. 60/108,666, filed on Nov. 16, 1998.

(51) Int. Cl.[7] .................................................. G11B 17/028
(52) U.S. Cl. ...................................................... 360/97.02
(58) Field of Search ........................... 360/97.01, 97.02, 360/97.03, 254.3, 254.4

(56) References Cited

U.S. PATENT DOCUMENTS

| | | | |
|---|---|---|---|
| 3,558,831 A | 1/1971 | Prescott et al. | 360/97.02 |
| 4,110,802 A | 8/1978 | Ho et al. | 360/97.02 |
| 4,280,156 A | 7/1981 | Villette | 360/97.02 |
| 4,493,554 A | 1/1985 | Pryor et al. | 360/97.02 |
| 4,555,739 A | 11/1985 | Le Van et al. | 360/97.02 |
| 4,562,500 A | 12/1985 | Bygdnes | 360/97.02 |
| 4,630,926 A | 12/1986 | Tanaka et al. | 360/97.02 |
| 4,661,873 A | 4/1987 | Schulze | 360/97.02 |
| 4,673,996 A | 6/1987 | White | 360/97.02 |
| 4,703,376 A | 10/1987 | Edwards et al. | 360/97.02 |
| 4,731,777 A | 3/1988 | Yoshitoshi et al. | 360/97.02 |
| 4,739,425 A | 4/1988 | Dierkes et al. | 360/97.02 |
| 4,784,012 A | 11/1988 | Marra | 360/97.02 |
| 4,794,588 A | 12/1988 | Yoshitoshi et al. | 360/97.02 |
| 4,802,042 A | 1/1989 | Strom | 360/97.02 |
| 4,819,105 A | 4/1989 | Edwards | 360/97.02 |
| 4,839,756 A | 6/1989 | Chew et al. | 360/97.02 |
| 4,866,553 A | 9/1989 | Kubo et al. | 360/97.02 |
| 4,870,519 A | 9/1989 | White | 360/97.02 |
| 4,890,172 A | 12/1989 | Watt et al. | 360/97.02 |
| 4,949,206 A | 8/1990 | Phillips et al. | 360/97.02 |
| 4,958,337 A | 9/1990 | Yamanaka et al. | 360/97.02 |
| 4,982,300 A | 1/1991 | Forbord | 360/97.02 |
| 5,004,207 A | 4/1991 | Ishikawa et al. | 360/97.02 |
| 5,021,905 A | 6/1991 | Sleger | 360/97.02 |
| 5,029,026 A | 7/1991 | Stefansky et al. | 360/97.02 |
| 5,062,017 A | 10/1991 | Strom et al. | 360/97.02 |
| 5,097,370 A | 3/1992 | Hsia | 360/97.02 |
| 5,128,822 A | 7/1992 | Chapin et al. | 360/97.02 |

(List continued on next page.)

FOREIGN PATENT DOCUMENTS

| | | |
|---|---|---|
| EP | 0 426 353 A2 | 5/1991 |
| EP | 0 463 752 A2 | 1/1992 |
| EP | 0 491 563 A2 | 6/1992 |
| EP | 0 582 464 A2 | 2/1994 |
| EP | 0 801 387 A2 | 10/1997 |
| FR | 2518-791 A | 6/1983 |
| GB | 2 050 670 A | 1/1981 |
| GB | 2 100052 A | 12/1982 |
| GB | 2 326 755 A | 12/1998 |
| JP | 632 344 55 | 9/1988 |
| JP | 3-83281 | 4/1991 |
| JP | 3-104079 | 5/1991 |
| JP | 09251769 A | 9/1997 |
| JP | 9-293370 | 11/1997 |
| WO | WO 93/10494 | 5/1993 |
| WO | WO 96/34390 | 10/1996 |

OTHER PUBLICATIONS

US 6,091,569, 07/2000, Allsup et al. (withdrawn)

*Primary Examiner*—Jefferson Evans
(74) *Attorney, Agent, or Firm*—Irell & Manella, LLP

(57) ABSTRACT

A disk guard which can limit a z-axis movement of a disk within a hard disk drive. The disk guard may be mounted to a housing of the disk drive adjacent to the disk. A portion of the disk may extend into a groove of the disk guard. The groove limits the z-axis movement of the disk when the disk drive is subjected to a shock load.

18 Claims, 2 Drawing Sheets

U.S. PATENT DOCUMENTS

| | | | |
|---|---|---|---|
| 5,130,870 A | 7/1992 | Jabbari | 360/99.08 |
| 5,159,508 A | 10/1992 | Grill et al. | 360/235.2 |
| 5,161,900 A | 11/1992 | Bougathou et al. | 384/133 |
| 5,167,167 A | 12/1992 | Tiernan, Jr. et al. | 74/573 R |
| 5,175,661 A | 12/1992 | Mizuno et al. | 360/97.02 |
| 5,187,621 A | 2/1993 | Tacklind | 360/97.02 |
| 5,200,868 A | 4/1993 | Chapin et al. | 360/97.02 |
| 5,202,803 A | 4/1993 | Albrecht et al. | 360/97.02 |
| 5,214,549 A | 5/1993 | Baker et al. | 360/97.02 |
| 5,241,438 A | 8/1993 | Matsushima | 360/97.02 |
| 5,243,495 A | 9/1993 | Read et al. | 361/685 |
| 5,247,493 A | 9/1993 | Kime et al. | 360/97.02 |
| 5,262,911 A | 11/1993 | Cain et al. | 360/244.6 |
| 5,262,913 A | 11/1993 | Stram et al. | 360/97.02 |
| 5,267,109 A | 11/1993 | Chapin et al. | 360/236.5 |
| 5,274,519 A | 12/1993 | Saito et al. | 360/254.3 |
| 5,287,235 A | 2/1994 | Cunningham et al. | 360/236.9 |
| 5,293,282 A | 3/1994 | Squires et al. | 360/97.02 |
| 5,309,303 A | 5/1994 | Hsia et al. | 360/97.02 |
| 5,319,511 A | 6/1994 | Lin | 360/256.1 |
| 5,343,343 A | 8/1994 | Chapin | 360/97.02 |
| 5,347,414 A | 9/1994 | Kano | 360/254.4 |
| 5,365,389 A | 11/1994 | Jabbari et al. | 360/97.02 |
| 5,369,538 A | 11/1994 | Moe et al. | 360/265.1 |
| 5,396,386 A | 3/1995 | Bolasna et al. | 360/236.1 |
| 5,396,387 A | 3/1995 | Murray | 360/236.8 |
| 5,402,290 A | 3/1995 | Daniel | 360/265.1 |
| 5,404,256 A | 4/1995 | White | 360/236.3 |
| 5,410,402 A | 4/1995 | Li et al. | 356/243.3 |
| 5,422,776 A | 6/1995 | Thorson et al. | 360/98.07 |
| 5,426,562 A | 6/1995 | Morehouse et al. | 360/97.02 |
| 5,442,638 A | 8/1995 | Awad et al. | 714/6 |
| 5,455,728 A | 10/1995 | Edwards et al. | 360/256.2 |
| 5,460,017 A | 10/1995 | Taylor | 68/23.2 |
| 5,463,527 A | 10/1995 | Hager et al. | 361/685 |
| 5,469,311 A | 11/1995 | Nishida et al. | 360/97.02 |
| 5,537,272 A | 7/1996 | Kazmierczak et al. | 360/99.08 |
| 5,546,250 A | 8/1996 | Diel | 360/97.02 |
| 5,555,144 A | 9/1996 | Wood et al. | 360/98.08 |
| 5,570,249 A | 10/1996 | Aoyagi et al. | 360/244.2 |
| 5,610,776 A | 3/1997 | Oh | 360/53 |
| 5,636,090 A | 6/1997 | Biogenzahn et al. | 360/256.4 |
| 5,663,853 A | 9/1997 | Park | 360/236.4 |
| 5,673,158 A | 9/1997 | Ichimura | 360/97.01 |
| 5,677,813 A | 10/1997 | Yoshida | 360/97.02 |
| 5,703,734 A | 12/1997 | Berberich et al. | 360/97.02 |
| 5,754,353 A | 5/1998 | Behrens et al. | 360/53 |
| 5,768,249 A | 6/1998 | Ro et al. | 369/263 |
| 5,781,373 A | 7/1998 | Larson et al. | 369/263 |
| 5,801,899 A | 9/1998 | Genheimer | 360/97.01 |
| 5,815,349 A | 9/1998 | Frater | 360/245.7 |
| 5,822,139 A | 10/1998 | Ayabe | 360/31 |
| 5,831,795 A | 11/1998 | Ma et al. | 360/254.3 |
| 5,844,754 A | 12/1998 | Stefansky et al. | 360/266.1 |
| 5,844,911 A | 12/1998 | Schadegg et al. | 714/710 |
| 5,875,067 A | 2/1999 | Morris et al. | 360/97.01 |
| 5,885,005 A | 3/1999 | Nakano et al. | 384/113 |
| 5,886,851 A | 3/1999 | Yamazaki et al. | 360/97.02 |
| 5,901,017 A | 5/1999 | Sano et al. | 360/245.9 |
| 5,926,347 A | 7/1999 | Kouhei et al. | 360/254.3 |
| 5,930,079 A | 7/1999 | Vera et al. | 360/245.7 |
| 5,930,080 A | 7/1999 | Frater et al. | 360/234.5 |
| 5,936,927 A | 8/1999 | Soga et al. | 369/75.1 |
| 5,969,901 A | 10/1999 | Eckberg et al. | 360/97.01 |
| 5,987,733 A | 11/1999 | Goss | 29/603.03 |
| 6,011,670 A | 1/2000 | Balsley, Jr. et al. | 360/97.01 |
| 6,034,941 A | 3/2000 | Ro | 369/263 |
| 6,046,883 A | 4/2000 | Miller | 360/245.7 |
| 6,055,134 A * | 4/2000 | Boutaghou | 360/254.4 |
| 6,084,744 A | 7/2000 | Genheimer et al. | 360/97.02 |
| 6,088,192 A | 7/2000 | Riener et al. | 360/266.1 |
| 6,088,194 A | 7/2000 | Imaino et al. | 360/266 |
| 6,088,202 A | 7/2000 | Kabasawa et al. | 360/245 |
| 6,091,576 A * | 7/2000 | Eckerd et al. | 360/254.8 |
| 6,115,214 A * | 9/2000 | Allsup | 360/254.3 |
| 6,154,360 A | 11/2000 | Kaczeus, Sr. et al. | 248/633 |
| 6,157,522 A | 12/2000 | Murphy et al. | 360/294.6 |
| 6,166,901 A | 12/2000 | Gamble et al. | 361/685 |
| 6,185,075 B1 | 2/2001 | Tsujino et al. | 360/266.1 |
| 6,185,807 B1 | 2/2001 | Kazmierczak et al. | 29/450 |
| 6,198,606 B1 | 3/2001 | Boutaghou et al. | 360/294.3 |
| 6,201,668 B1 | 3/2001 | Murphy | 360/294.4 |
| 6,205,005 B1 | 3/2001 | Heath | 360/266.1 |
| 6,212,029 B1 * | 4/2001 | Fioravanti | 360/97.01 |
| 6,226,143 B1 | 5/2001 | Stefansky | 360/97.02 |
| 6,226,145 B1 * | 5/2001 | Genheimer et al. | 360/97.02 |
| 6,226,152 B1 | 5/2001 | Tanaka et al. | 360/244.6 |
| 6,229,668 B1 | 5/2001 | Huynh et al. | 360/97.01 |
| 6,233,124 B1 | 5/2001 | Budde et al. | 360/294.4 |
| 6,236,531 B1 * | 5/2001 | Allsup et al. | 360/97.01 |
| 6,239,943 B1 | 5/2001 | Jennings et al. | 360/97.02 |

* cited by examiner

IMPACT GUARD FOR LIMITING HARD DISK MOVEMENT

This application claims benefit of Provisional Appln. 60/108,666 filed Nov. 16, 1998.

BACKGROUND OF THE INVENTION

1. Field of the Invention

The present invention relates to a disk guard which can limit z-axis movement of a disk within a hard disk drive.

2. Background Information

Hard disk drives typically contain a plurality of hard disks that are rotated by a spindle motor. The hard disks spin relative to a plurality of heads which can magnetize or sense the magnetic fields of the disk surfaces to store and retrieve binary information as is well known in the art.

Each head is typically gimbal mounted to a suspension arm. A head and suspension arm are commonly referred to as a head gimbal assembly (HGA). The suspension arms are attached to an actuator arm which can pivot about a base plate of the drive. The actuator arm has a voice coil that is connected to a drive circuit (not shown) and coupled to a magnet assembly. The voice coil and magnet assembly are commonly referred to as a voice coil motor. The drive circuit provides a current which excites the voice coil motor and causes the actuator arm to rotate about the base plate. Rotation of the actuator arm moves the heads relative to the surfaces of the disks. Data is typically stored on the disk within annular tracks. Movement of the heads allows the drive to access the different disk tracks.

An external shock or vibration load can cause the disks to move into the actuator arm. This contact may damage the disk surfaces and corrupt data stored in the disks. It would be desirable to prevent contact between the actuator arm and the data portions of the disks during a shock occurrence. It would also be desirable to provide a relatively inexpensive solution to this problem.

SUMMARY OF THE INVENTION

One embodiment of the present invention is a disk guard which can limit a z-axis movement of a disk within a hard disk drive. The disk guard may be mounted to a housing of the disk drive adjacent to the disk. A portion of the disk may extend into a groove of the disk guard. The groove limits the z-axis movement of the disk when the disk drive is subjected to a shock load.

DETAILED DESCRIPTION

Figure 1:
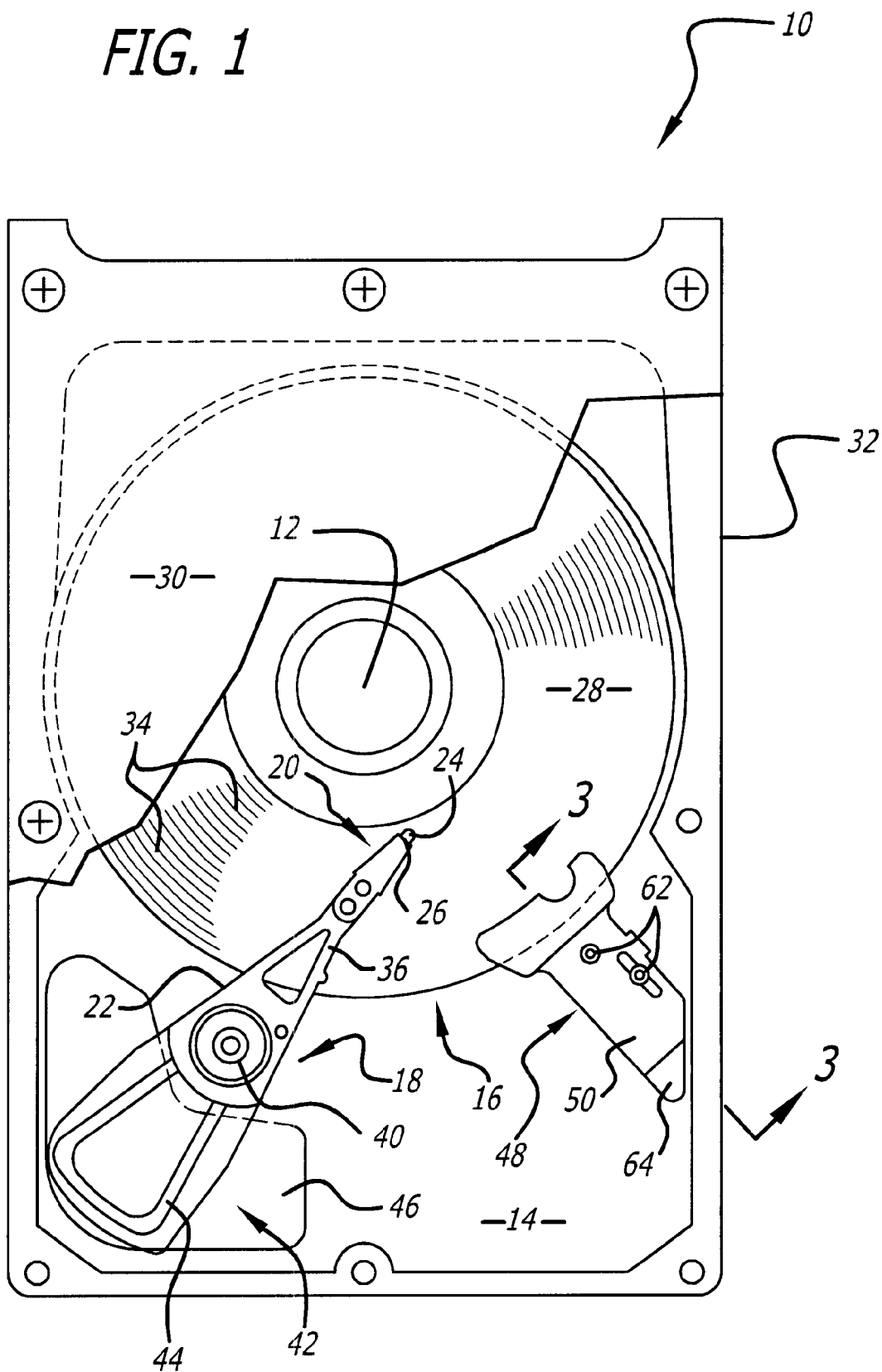
FIG. 1 is a top view of a hard disk drive of the present invention.
Figure 2:
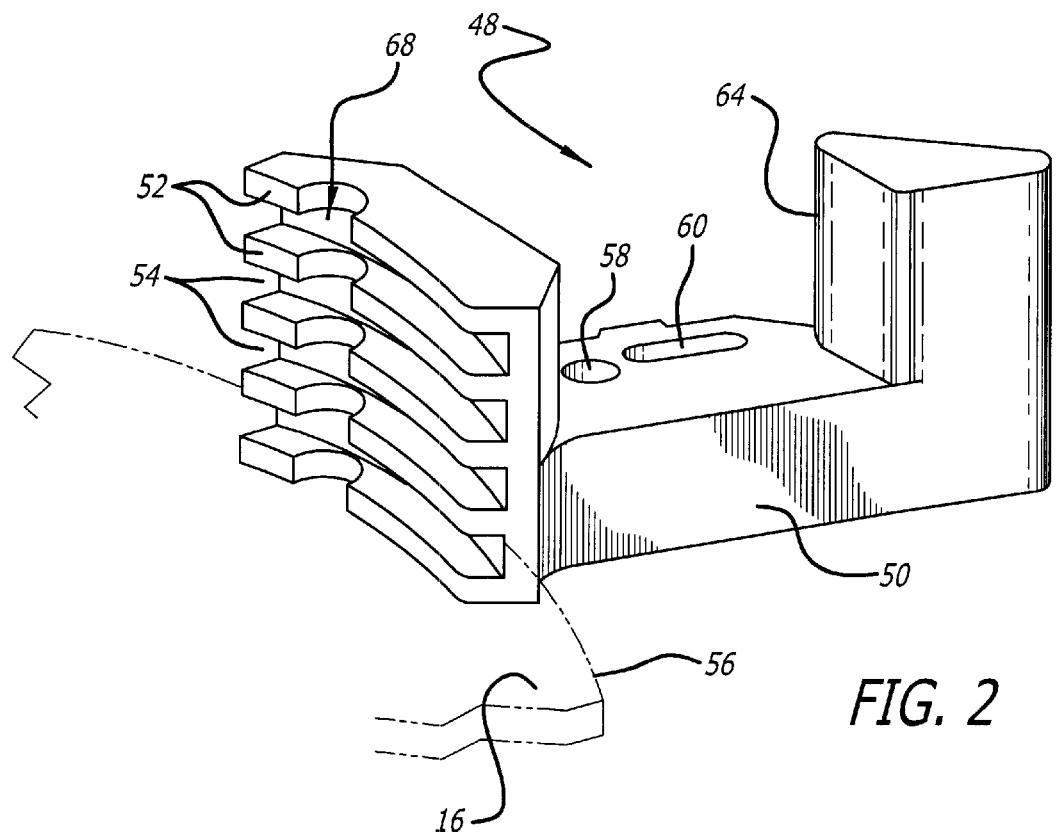
FIG. 2 is a perspective view of a disk guard of the disk drive.
Figure 3:
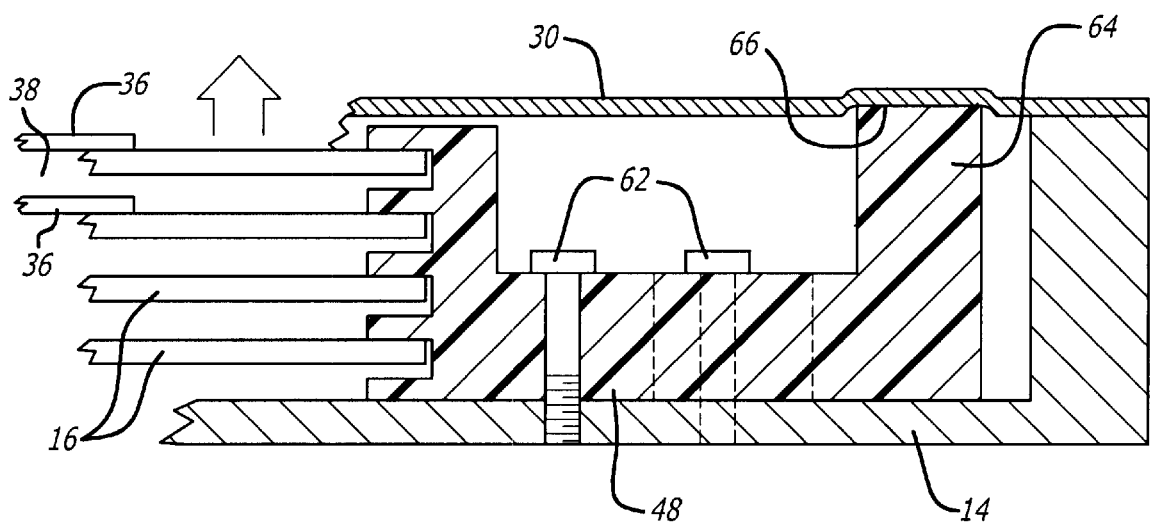
FIG. 3 is a side view showing a disk guard limiting the movement of a disk within the disk drive of FIG. 1.

Referring to the drawings more particularly by reference numbers, FIGS. 1, 2 and 3 show an embodiment of a hard disk drive 10 of the present invention. The disk drive 10 may include a spindle motor 12 that is mounted to a base plate 14. The spindle motor 12 rotates a plurality of disks 16. The disks 16 rotate relative to an actuator arm assembly 18. The actuator arm assembly 18 includes a plurality of head gimbal assemblies 20 that are attached to an actuator arm 22. Each head gimbal assembly 20 may include a head 24 that is gimbal mounted to a suspension arm 26. Each head 24 is magnetically coupled to a disk surface 28. The disks 16 and actuator arm assembly 18 may be enclosed by a cover plate 30 that is attached to the base plate 14. The cover 30 and base 14 plates form a disk drive housing 32.

Each head 24 may include a write element (not shown) and a read element (not shown) that are coupled to an electronic circuit(s) (not shown). The circuit and read/write elements can magnetize and sense the magnetic field of each disk surface 28 to store and retrieve data within the disk drive. The data is typically stored within sectors that extend along annular tracks 34 of the disks 16. Each head 24 typically includes an air bearing surface which cooperates with an air flow created by the rotating disks 16 to create an air bearing between the head 24 and the disk surface 28. The air bearing prevents contact and wear between the disks 16 and the heads 24.

The actuator arm 22 may include a plurality of individual actuator beams 36 that are separated by slots 38 which allow the disks 16 to spin between the beams 36. The actuator arm 22 may be pivotally mounted to the base plate 14 by a bearing assembly 40.

The actuator arm 22 may further have a voice coil portion 42 that supports a voice coil 44. The voice coil 44 may be coupled to a magnet assembly 46 and a driver circuit (not shown). When excited by the driver circuit the voice coil 44 cooperates with the magnet assembly 46 to create a torque that swings the actuator arm 22 relative to the base plate 14. The pivotal movement of the actuator arm 22 moves the heads 24 across the disk surfaces 28 to access different tracks of the disks 16.

The disk drive 10 may have a disk guard 48 that is attached to the housing 32. The disk guard 48 may include a plate 50 which has a plurality of ridges 52. The ridges 52 are separated by a plurality of grooves 54. The outer edges 56 of the disks 16 are located within the grooves 54. The width of each groove 54 is larger than the thickness of each disk 16 so that the edges 56 can rotate within the grooves 56 without interference from the ridges 52. The clearance between the ridges 52 and the disks 16 is typically smaller than the clearance between the actuator arm 22 and the disks 16 so that the disks 16 strike the ridges 52 before hitting the actuator arm 22 if the disks 16 move in a z direction. By way of example, the width of a groove 54 may be 0.006 inches wider than the thickness of a disk 16. The longitudinal axis of each groove 54 may extend along an arcuate path to conform to the radial shape of the disks 16.

The plate 50 may include a pair of mounting holes 58 and 60 which allow fasteners 62 to attach the guard 48 to the base plate 14 of the drive 10. Hole 60 may be slotted to compensate for tolerances in the guard 48 and the base plate 14. The plate 50 may further have an alignment tab 64 that extends into an alignment depression 66 in the cover plate 30. The alignment tab 64 aligns the disk guard 48 within the disk drive 10. The alignment tab 64 may have a triangular shape which matches a corresponding triangular shape of the depression 66 to insure that the guard 48 is properly oriented within the drive 10.

The disk guard 48 may be constructed from a damping material that will dampen shock loads that are transmitted from the disks 16 to the ridges 52. By way of example, the disk guard plate 50 may be constructed from a molded ABS plastic material. The grooves 54 may be machined into the plate 50 after the plate 50 is molded to insure close mechanical tolerances. The plate 50 may have a relief groove 68 that minimizes the residual stresses in the plastic material and assist in maintaining parallelism between the ridges 52. It is desirable to maintain parallelism to create relatively close tolerances between the ridges 52 and the disks 16.

As shown in FIG. 3, a shock load may cause the disks 16 to move relative to the base plate 14. The ridges 52 of the disk guard 48 impede the movement of the disks 16 along the z-axis so that the disk surfaces 28 do not strike the actuator arm 22 in the data zones of the disks 16. The outer portions of the disks 16 which strike the ridges 52 typically do not contain data so that data is not lost by the shock impact. The damping material of the disk guard 48 also dampens the impact of the disks 16 to absorb and attenuate the shock load.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A disk guard for a disk of a hard disk drive, comprising:
   a plate which has a plurality of ridges that are separated by a disk groove that is adapted to receive the edge of the disk, said plate further having a relief groove that is at an angle relative to said disk groove to provide stress relief for said ridges.

2. The disk guard of claim 1, wherein said disk groove has a longitudinal axis which extends along an arcuate path.

3. The disk guard of claim 1, wherein said plate includes a mounting hole.

4. The disk guard of claim 1, wherein said plate includes an alignment tab.

5. The disk guard of claim 1, wherein said plate is constructed from a damping material.

6. The disk guard of claim 1, wherein said relief groove is perpendicular to said disk groove.

7. A disk assembly of a hard disk drive, comprising:
   a disk;
   a spindle motor that rotates said disk;
   a disk guard that is located adjacent to said disk, said disk guard has a plurality of ridges that are separated by a disk groove that receives at least a portion of said disk, said plate further having a relief groove that is at an angle relative to said disk groove to provide stress relief for said ridges.

8. The disk assembly of claim 7, wherein said disk groove has a longitudinal axis which extends along an arcuate path.

9. The disk assembly of claim 7, wherein said disk guard includes a mounting hole.

10. The disk assembly of claim 7, wherein said disk guard includes an alignment tab.

11. The disk assembly of claim 7, wherein said disk guard is constructed from a damping material.

12. The disk assembly of claim 7, wherein said relief groove is perpendicular to said disk groove.

13. A hard disk drive, comprising:
   a housing;
   a spindle motor attached to said housing;
   a disk that is rotated by said spindle motor;
   an actuator arm assembly that is attached to said base plate, said actuator arm assembly includes a head that is coupled to said disk;
   a disk guard that is attached to said housing, said disk guard including a plate which has a plurality of ridges that are separated by a disk groove that receives at least a portion of said disk, said plate further having a relief groove that is at an angle relative to said disk groove to provide stress relief for said ridges.

14. The hard disk drive of claim 13, wherein said disk groove has a longitudinal axis which extends along an arcuate path.

15. The hard disk drive of claim 13, wherein said disk guard includes a mounting hole that receives a fastener that attaches said disk guard to said housing.

16. The hard disk drive of claim 13, wherein said disk guard includes an alignment tab that extends into an alignment depression in a cover plate of said housing.

17. The hard disk drive of claim 13, wherein said disk guard is constructed from a damping material.

18. The hard disk drive of claim 13, wherein said relief groove is perpendicular to said disk groove.

* * * * *